UNITED STATES PATENT OFFICE.

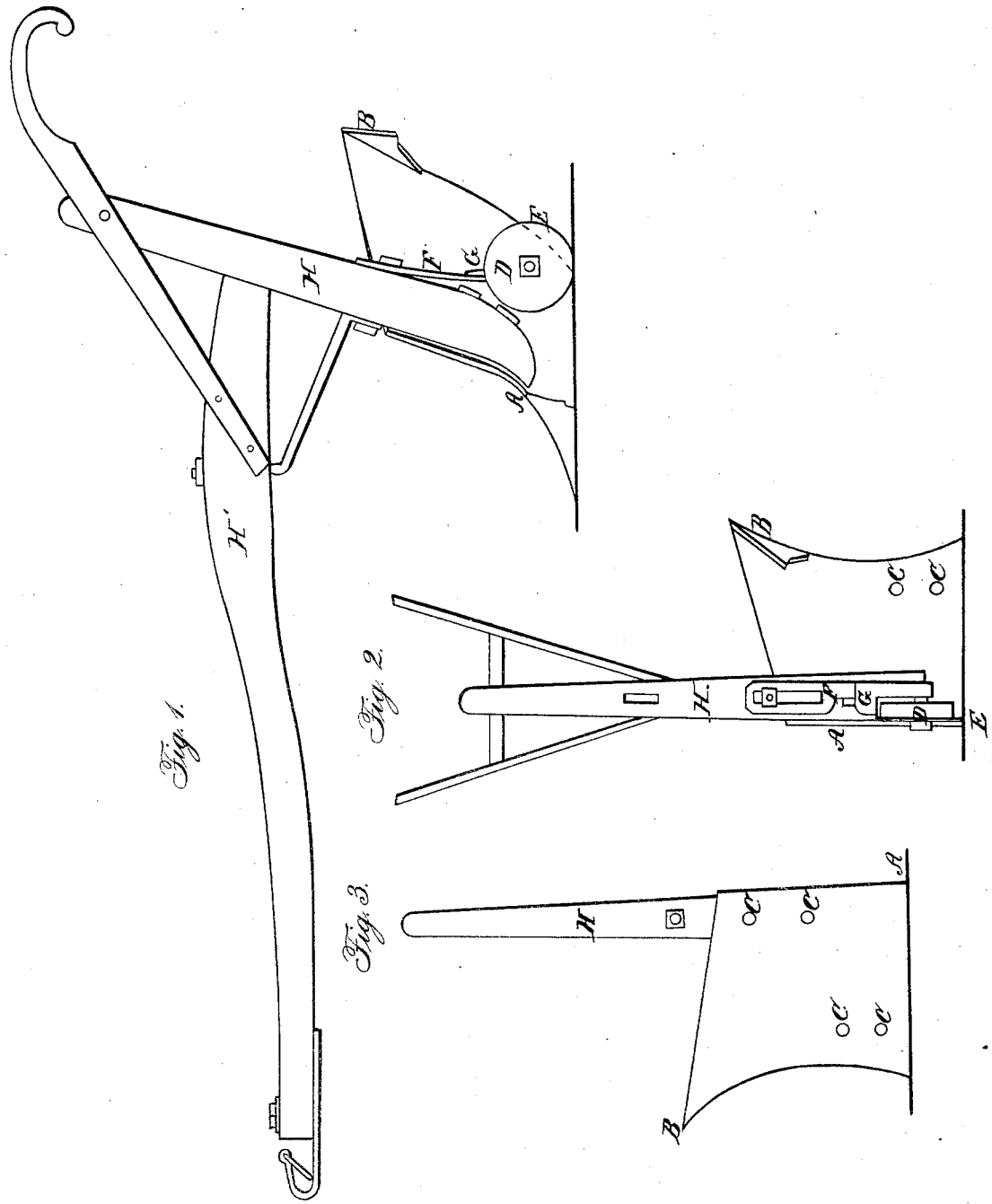

ISAAC COOK AND JNO. T. BEVER, OF HAINESVILLE, MISSOURI.

IMPROVEMENT IN PLOWS.

Specification forming part of Letters Patent No. 24,617, dated July 5, 1859.

*To all whom it may concern:*

Be it known that we, ISAAC COOK and JOHN T. BEVER, of the town of Hainesville, in the county of Clinton and State of Missouri, have invented a new and useful Improvement in Plows; and we do hereby declare that the following is a full, clear, and exact description of the same, reference being had to the accompanying drawings, forming a part of this specification, in which—

Figure 1 is a side elevation of the plow, viewed from the landside. Fig. 2 is a rear view, and Fig. 3 a front view.

Similar letters of reference in each of the several figures indicate corresponding parts.

The nature of our invention consists in the combination of a double-pointed reversible mold-board, A B C, made without landside-bars, of a revolving landside-wheel, D, which has a circular cutting-plate, E, attached to its landside-face, the said landside-wheel being arranged so as to be in line with that point of the mold-board which may have been adjusted to perform the plowing, and also taking the place of the ordinary landside-bar or plate, it being attached to an adjustable slotted bracket, F, of the standard H, said bracket having a clearing-scraper, G, attached to it, all as represented in the drawings.

By our invention the use of a landside-bar to each point of a double-pointed reversible mold-board plow is dispensed with, as the circular landside-wheel answers for both points of the plow, and takes the place of the landside-bar in a double-pointed reversible mold-board plow. The draft of the plow at the heel is also greatly eased, and the plowman is aided in guiding and steadying the plow while turning up the soil is being effected. The landside-wheel is likewise always kept free from dirt, as the scraper is continually removing the adhering soil. Facilities are also afforded for adjusting the landside-wheel to suit the depth at which the plow is set to cut.

What we claim as our invention, and desire to secure by Letters Patent, is—

The combination and arrangement of the sharp-edged landside-wheel D E with a reversible double-pointed mold-board, A B C, which has no landside-bars, substantially as and for the purposes herein set forth.

In testimony whereof we have hereunto signed our names before two subscribing witnesses.

ISAAC COOK.
JOHN T. BEVER.

Witnesses:
JAMES R. COFFMAN,
HENRY H. ROBERTSON.